May 8, 1934.  F. A. HAYES  1,958,303
FRICTION TRANSMISSION CONTROL DEVICE
Filed Aug. 2, 1930   2 Sheets-Sheet 1
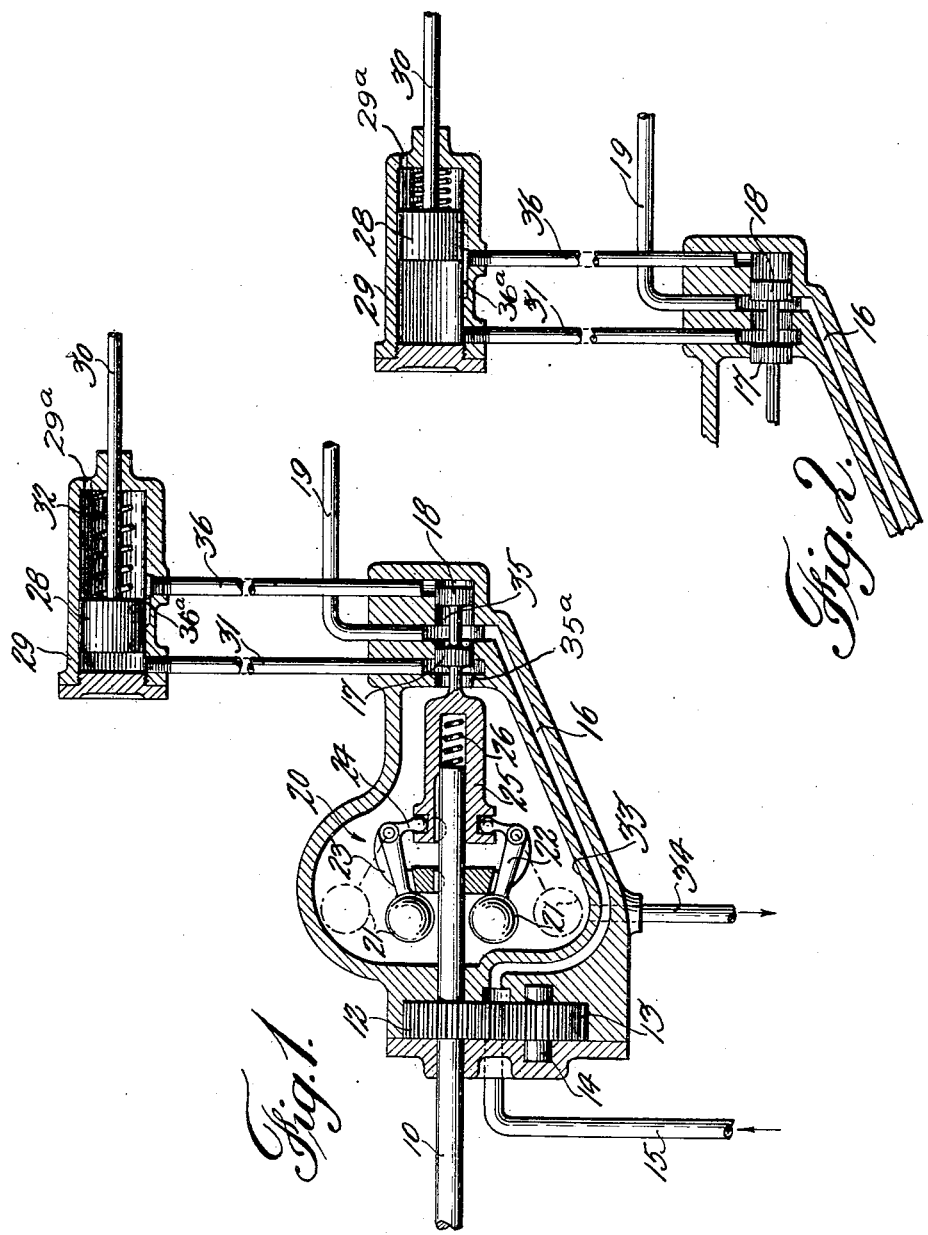
INVENTOR.
FRANK A. HAYES
BY
ATTORNEY

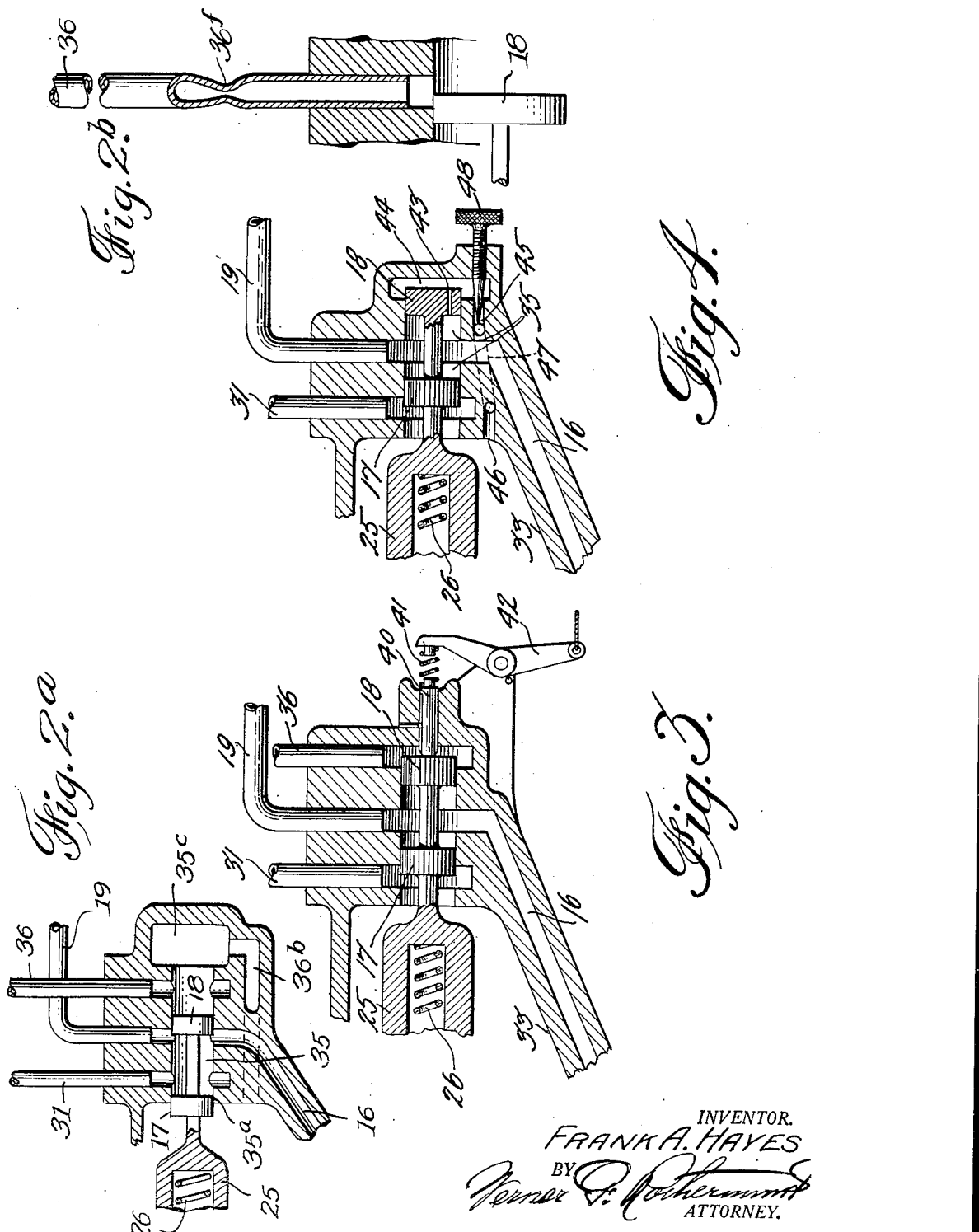

Patented May 8, 1934

1,958,303

UNITED STATES PATENT OFFICE 1,958,303

FRICTION TRANSMISSION CONTROL DEVICE

Frank A. Hayes, Middletown, N. J.

Application August 2, 1930, Serial No. 472,602

17 Claims. (Cl. 74—336.5)

This invention relates to improvements in controlling devices for variable speed friction transmissions and is especially applicable to such transmissions when they are used to drive a load such as a motor vehicle.

In my Patent No. 1,698,229, controlling means responsive to the speed of the engine or other driving means are shown and described. They consist of a pump driven at the speed of the driving means, a bypass valve under control of the operator, and a piston and cylinder for operating the control. This provides a satisfactory method for many purposes, but under certain conditions it is undesirable to leave the speed adjustment to the operator, this being particularly true in the case of commercial vehicles such as buses, where it is desirable to pre-establish maximum engine speeds when operating on the transmission and at the same time insure that enough power will be developed to secure rapid acceleration and sufficient hill climbing ability so that the best schedule may always be maintained. In order to gain these advantages I propose in my present invention to interpose between the fluid pump and the control cylinder, and in place of the regulating valve of my former invention, a centrifugal governor which acts through a special valve to increase the ratio of the transmission when the engine or driving means exceed a certain speed and to decrease its ratio when the engine falls below that speed.

It will be readily understood that the arrangement of a governor acting upon the transmission speed ratio does not in any way limit the maximum speed of the vehicle on high gear as is the case with the use of a governor acting on the engine throttle.

It has been proposed in the prior art to use a centrifugal governor operating at engine speed to control the speed ratio changes directly, but this is considered not so practicable because even in the most simple forms of such controls there is present a relatively large amount of friction, and the governor is a relatively sensitive device which provides a very feeble source of energy. As a result it is believed that such a system would not prove satisfactory in operation, in view of the fact that in order to overcome the control friction, the governor would go to a higher speed than desired and having once overcome the friction, the control would move further than required which would accordingly drop the speed of the driver and governor below the desired speed. In short, anyone who is familiar with such governors will readily understand that serious hunting would develop under such conditions. To overcome this objection I use a fluid control in connection with the governor and provide a valve for actuation by the governor which is balanced, practically frictionless and may be made to act as dash pot for damping any periodic fluctuation which may tend to occur. This valve in connection with the fluid control further provides a means for holding the vehicle in high gear at a speed much below its speed of change into high gear which is very desirable for most operating conditions.

An object of the invention is to provide a new and novel control means for a friction transmission of variable speed ratio in which said control means is of such construction as to overcome the objections hereinbefore referred to.

Various other objects and advantages of the invention will be in part obvious from an inspection of the accompanying drawings and a careful consideration of the following particular description and claims of one form of mechanism embodying my invention.

In the drawings:

Figure 1 is a longitudinal section of a simple form of the present invention showing the governor, control piston and balanced valve in the position occupied when the transmission is operating at a low "speed".

Figure 2 is a detail section similar to Fig. 1 showing the balanced valve and control piston in a high speed position.

Fig. 2a is a detail sectional view illustrating a construction in which the speed-control piston is moved toward low speed position by fluid pressure.

Fig. 2b is a detail sectional view illustrating a modification enabling the control cylinder and piston to have a dash-pot effect.

Figure 3 is a detail section on an enlarged scale of a modification of the balanced valve mechanism.

Figure 4 is a detail section of a further modification of the balanced valve mechanism.

Referring to the drawings, 10 designates a shaft which may be the drive shaft of the transmission or any auxiliary shaft of the engine or transmission. Keyed to it is the oil pump gear 12 (any form of pump may be used) which drives the idler gear 13 on stud 14. Oil is taken from the transmission case or other convenient place through suction pipe 15 and is delivered by the pump to the pressure duct 16 from which it fills the space 35 between the two valve pistons 17 and 18 and may be taken off from there by the pipe 19 to acuate any other devices or lubricate the engine or transmission. On this pipe line 19 a relief valve (not shown) may be conveniently placed. Mounted on shaft 10 is a centrifugal governor 20 shown of the flyball type having balls or weights 21 pivoted by means of the arms 22 to a supporting member 23 which is fixed to shaft 10. Bell cranks 24 forming part of the arms 22, engaged with a revolving sleeve 25, sliding on shaft 10, tend to pull the sleeve towards the left when the weights are actuated outwardly toward the dotted line position by an increase in speed to or above that necessary to overcome the tension of the opposing spring 26 which is set for the desired speed characteristic of the driving member.

A servo-motor comprising a piston 28 moving in a cylinder 29 operates a rod 30 which may be connected in any suitable manner to control the change of ratio of the transmission, as by means of the control rods shown in my Patent No. 1,698,229 which are designated by the numerals 54 and 63 in Fig. 3 thereof. Pressure is supplied to the cylinder 29 by means of the pipe 31 to actuate the piston 28. The piston 28 is shown opposed by a spring 32 for return movement but of course if desired the valve 17—18 may be made double acting and the fluid used to move the piston 28 in either direction. The tension of this spring determines the minimum pressure which will advance the piston, as will be readily understood.

The operation of this control means is as follows:—When starting the vehicle or other device to be operated by the transmission, the various parts of the control are in the speed-ratio position shown in Figure 1. While the engine or other driver is running slowly, the weights 21 are in a position adjacent to the shaft 10 as shown, the piston 17 of the valve closing the opening to the pipe 31 and cylinder 29 to the fluid pressure and permitting pipe 31 to drain through port 35a to the governor casing 33 and the outlet 34. The engine may now be driving the vehicle at the extreme low speed ratio provided by the transmission. As the vehicle accelerates or the load otherwise decreases, the engine speeds up until it attains the predetermined speed for which spring 26 is set, when the weights 21 will move outwardly due to centrifugal force thus compressing spring 26 and moving valve 17—18 towards the left. Piston 17 in its movement, first shuts off pipe 31 from drain 35a and then connects it to the space or chamber 35 between the valve pistons 17—18 as in Fig. 2 thus allowing fluid under pressure to flow from passage 16 through pipe 31 to cylinder 29 which advances piston 28 towards the right, thus increasing the speed ratio of the transmission and loading up the engine so as to keep its speed approximately constant until the high speed position of the transmission mechanism is reached when the piston 28 will uncover the passage 36a in the cylinder wall leading to the pipe 36 and allow fluid under pressure to flow to the right side of the valve 18. This tends to hold valve 17—18 in its left hand position thus reducing the effect of spring 26 and increasing the effect of the centrifugal action of the weights 21 so that, for the transmission to come out of the high speed position, the speed of the engine will have to drop any desired amount below its initial governed speed before the governor will act to bring the transmission out of high. It might be thought that this result could be obtained by the design of the governor itself but on reflection it will be seen that if the governor is designed to have an appreciable lag the transmission will overload the engine until the engine speed falls well below its initial governor speed, when the governor will act to reduce the ratio and speed the engine up again with the possible result that this process may be repeated several times causing objectionable surging of the vehicle.

It will be seen that the construction of the valve pistons 17—18 are ideal since they are rotatable as well as slidable (rotating constantly with the governor) and that they are flooded with oil, and inasmuch as the pressures are equally balanced it is manifest that the resistance to longitudinal movement of the valve is practically zero. However, I do not limit myself to any particular form of valve, it being obvious that the preferred form as shown in the drawings may be more or less subject to modifications.

It is suggested that a constriction might be made in the pipe 36, as indicated at 36f, for example, in Fig. 2b, and the piston 28 may then if desired, be used as a dash pot to damp any undesirable fluctuations in the action of the governor. To avoid possibility of the piston 28 or valve 17—18 being locked by oil trapped in the cylinder on the right hand side of the piston and valve the cylinder may be provided with a relief port 29a.

With reference to Figs. 3 and 4, these show two different forms of manual control by which the automatic action of the device may be controlled at the will of an operator thereby making the action of the mechanism more flexible in character.

In Fig. 3, a pin 40 is slidably mounted in an extended portion of the casing 33 so as to bear against the center end portion of the valve 17—18, and pressure may be brought to bear against this pin by means of the spring and lever connection 41, 42. When the lever 42 is actuated by a pull on the cord attached to it the spring 41 opposes the action of the spring 26 which previously determined the critical or operating speed of the governor. Hence, with the spring 41 acting, the centrifugal force is resisted by the difference in pressure of springs 41 and 26 and the speed at which the governor acts is accordingly reduced. By adjusting the lever 42 the operator can therefore set the governor to operate at any desired speed of the shaft 10.

In Fig. 4, the pipe 36 has been eliminated and a small passage 43 has been formed in the valve element 18 so that the fluid may flow therethrough into the space or chamber 44 provided for that purpose. This chamber connects with the interior of the casing 33 by means of the openings 45, 46 and a passage 47, and a needle valve 48 controls the flow of the fluid therethrough. It will be understood that by permitting the fluid under pressure to enter the chamber 44 by means of the passage 43, a pressure will be set up against the end of the element 18 thereby creating a counteraction to the spring 26 similar to that of the spring 41 of Fig. 3. If it is desired to adjust this opposing pressure the needle valve 48 may be opened to any extent desired and some of the fluid permitted to drain back into the casing.

In Fig. 2a a construction is shown in which the valve 17—18 is double acting so that the control piston 28, Figs. 1 and 2, can be moved toward low speed position by fluid pressure. When the valve is in the position shown in Fig 2a pressure is supplied from passage 16 through space 35 to pipe 31 to the control cylinder as in Fig. 2. As the valve is moved rightwardly by the governor, due to decrease in engine speed, it first closes pipe 31, then opens the same to the interior of the casing through opening 35a and opens pipe 36 to space 35, thus admitting pressure from passage 16 to control cylinder 25 at the right of piston 28 and causing leftward movement of the latter, with consequent reduction of speed ratio. When later the valve is moved leftwardly by the governor, due to increasing engine speed, pipe 36 is first covered, then uncovered by valve 18 and the fluid in the control cylinder previously admitted thereto through pipe 36 is permitted to drain out through the same pipe, chamber 36c and passage 36b, to the casing.

Variations may be resorted to within the scope of the invention and portions of the improvements may be used without the others, whilst not departing from the spirit of the invention.

Having thus described my invention, I claim:

1. In a device adapted to automatically operate the speed ratio changing mechanism of a transmission driven from a power means, the combination of a means connectible to said mechanism and responsive to a fluid pressure for its actuation to change the speed ratio, a valve for the control of the fluid into and out of said means, a governor connected with said valve to operate the same and connected with the power means for actuation thereby at a relative speed which is independent of the speed ratio of the transmission, and means predetermining the power means speed at which the governor operates the valve.

2. A device adapted to operate the speed ratio changing mechanism of a friction transmission, comprising a cylinder, a piston within said cylinder connectible to said mechanism to effect speed ratio changes, a fluid pressure means adapted to actuate said piston, a valve adapted to control the movement of the fluid into and out of said cylinder said valve comprising a pair of pistons adapted for unitary rotation and sliding, and a governor driven by a transmission power means and responsive to the speed thereof to control the operation of said valve in predetermined sequence.

3. In a device adapted to operate the speed ratio changing mechanism of a friction transmission, comprising a cylinder, a piston within said cylinder connectible to said mechanism to effect speed ratio changes, a fluid pressure means adapted to actuate said piston, a valve having a port connected with the cylinder for movement of the fluid into and out of said cylinder, said valve comprising a pair of pistons adapted for unitary rotation and sliding to open or close said port, and a governor driven by a transmission power means to control the operation of said valve in accordance with a predetermined speed of the power means.

4. In a device adapted to automatically operate the speed ratio changing mechanism of a transmission driven from a power means, the combination of a cylinder, a piston within the cylinder adapted for connection with said mechanism to operate the same, a yielding means tending to oppose the movement of said piston in one direction, a fluid pressure means adapted to actuate the piston against the resistance of the yielding means, a governor connected with the power means for actuation thereby at a relative speed which is independent of the speed ratio of the transmission mechanism, yielding means opposing the operation of the governor, and a valve for controlling the fluid pressure flow into said cylinder and connected with the governor for movement thereby to an open or closed position in accordance with the force exerted on the governor by the last mentioned yielding means.

5. The combination with a speed ratio changing mechanism of a transmission operated from a power means, of a cylinder, a piston within the cylinder connected to said mechanism to operate the same, a preset spring means opposing the movement of the piston in one direction, a fluid pressure means adapted to move the piston against said spring, a valve rotatable by the power means and adapted to open or close said cylinder to the fluid pressure, and a governor rotationally actuated by the power means to slidably close said valve at a predetermined speed of the power means.

6. In apparatus of the class described, the combination with a speed ratio changing mechanism of a transmission, of a cylinder, a piston within the cylinder connected to said mechanism to operate the same, a spring means opposing the movement of the piston in one direction, an inlet and an outlet port on said cylinder, a fluid pressure means having connection with said ports, valve means to control the opening and closing of said ports, a preset spring, a governor under the control of said preset spring and operated by a power means at a relative speed which is independent of the speed ratio of the transmission, said valve means being controlled by the governor to open said cylinder to the fluid pressure means when the force due to the rotation of the governor exceeds the resistance of the preset spring.

7. In a device adapted to operate the speed ratio changing mechanism of a transmission driven from a power means, the combination of a means connectible to said mechanism to operate the same and responsive to a fluid pressure for its actuation, a valve for the control of the fluid into and out of said means, a governor driven from said power means and connected to said valve for the normal actuation thereof in accordance with a predetermined speed of the power means, and means manually settable to cause said governor to operate at a speed other than normal.

8. In apparatus of the class described, the combination with a speed ratio changing mechanism of a transmission driven by a power means, of a cylinder, a piston within the cylinder connected to said mechanism to operate the same, a spring means opposing the movement of the piston in one direction, an inlet and an outlet port on said cylinder, a fluid pressure means having connection with said ports, a valve to control the opening and closing of said ports, a preset spring, a governor operated by the power means under control of said preset spring and connected with the valve to operate the same, said valve means adapted to open said cylinder to the fluid pressure means when the force of the governor in accordance with the rotational speed of the power means exceeds the resistance of the preset governor spring, and means manually settable to counteract the effect of said preset spring means so as to cause said governor to operate at a speed determined by an operator.

9. In a speed-governing apparatus, in combination, a fluid-pressure operated servo-motor to actuate a speed control means, means for supplying actuating fluid to the servo-motor, a power-rotated balanced valve shiftable axially to control the supply of fluid to the servo-motor, and a governor connected with the valve to shift the same axially.

10. In a speed-governing apparatus, in combination, a fluid-pressure operated servo-motor to actuate a speed control mechanism, means for supplying actuating fluid to the servo-motor, power means to actuate the fluid supply means, a balanced valve shiftable axially to control the supply of fluid to the servo-motor and rotatable without affecting the supply of fluid, and a governor actuated by the power means and connected with the said valve to shift the same axially in accordance with the speed of the power means and to rotate the valve to keep the same freely shiftable.

11. In a speed-governing apparatus, the combination with a fluid-pressure actuated servo-motor to actuate a speed-control mechanism to produce increase of speed ratio between a power means and a load as the fluid pressure is increased, means for supplying actuating fluid to the servo-motor at a pressure varying with the speed of the power means, a balanced valve shiftable axially to control the supply of fluid to the servo-motor, means for constantly rotating the valve to keep the same freely shiftable, and a governor responsive to the speed of the power means and connected with the valve to shift the same.

12. In a speed-governing apparatus, the combination with the speed ratio changing mechanism of a transmission driven by a power means, of fluid pressure actuated means connected with the ratio changing mechanism to operate the same, a source of fluid pressure, a valve between the same and the fluid pressure actuated means to control the operation of the latter by varying the fluid pressure delivered thereto, and a governor driven by the power means at a relative speed which is independent of the speed ratio of the transmission, connected with the valve to actuate the same to cause increase of speed ratio with increasing speed of the power means.

13. In a speed-governing apparatus, the combination with the speed ratio changing mechanism of a transmission driven by a power means, of fluid pressure actuated means connected with the ratio changing mechanism to operate the same; a source of fluid pressure, valve means between the same and the fluid pressure actuated means to control the operation of the latter by varying the fluid pressure delivered thereto, a governor driven by the power means and connected with the valve means to operate the same in accordance with the speed of the power means, means for preventing valve-actuating operation of the governor at speeds of the power means below a predetermined value, and means effective at a predetermined position of the fluid pressure actuated means to oppose the said preventing means.

14. In a speed-governing apparatus, the combination with the speed ratio changing mechanism of a transmission driven by power means, of fluid pressure actuated means connected with said mechanism to operate the same, a source of fluid pressure for the fluid pressure actuated means, a valve to control the supply of fluid pressure to the latter means, a governor driven by the power means at a relative speed which is independent of the speed ratio of the transmission and connected with the valve to operate the same in accordance with the speed of the power means, means for preventing operation of the governor below a predetermined speed of the power means, and operator-operated means for varying said predetermined speed.

15. In a speed-governing apparatus, the combination with the speed ratio changing mechanism of a transmission driven by power means, of fluid pressure actuated means connected with said mechanism to operate the same, a source of fluid pressure for the fluid pressure actuated means, a rotatable axially shiftable valve to control the supply of fluid pressure to the latter means, and a centrifugal governor driven by the power means, connected with the valve to rotate the same continually and to shift the same axially in accordance with the speed of the power means.

16. In a speed-governing apparatus, the combination with the speed ratio changing mechanism of a transmission driven by a power means, of fluid pressure actuated means having a member connected with said ratio changing mechanism to operate the same, a source of fluid pressure connected with the fluid pressure actuated means, a valve responsive to the speed of the power means to open and close the connection between said source and the fluid pressure actuated means, yielding means for preventing opening movement of the valve at speeds of the power means below a predetermined value, and means effective at a predetermined high speed position of said member to oppose the action of said yielding means and thereby permit said valve to remain open at a power means speed below said predetermined value.

17. In a speed-governing apparatus, the combination with the speed ratio changing mechanism of a transmission driven by a power means, of fluid pressure actuated means for operating said mechanism, comprising a cylinder and a piston movable therein and having actuating connection with said mechanism, and a source of fluid pressure connected with said cylinder, the cylinder having an inlet port at one side of the piston for admission of fluid pressure to advance the piston and an outlet port at the opposite side of the piston to be opened and closed thereby; a valve chamber connected with said source, having an outlet port connected with the cylinder inlet port, a drain port, and an inlet port connected with the cylinder outlet port; a valve member movable in the valve chamber to open and close the outlet port and drain port and arranged to be subjected to fluid pressure from the cylinder through the outlet port thereof; a governor driven by the power means and connected with the valve member to actuate the same in accordance with the speed of the power means; and a spring for preventing operation of the governor below a predetermined speed of the power means.

FRANK A. HAYES.